(12) United States Patent
Jumpertz

(10) Patent No.: US 7,324,070 B2
(45) Date of Patent: Jan. 29, 2008

(54) DEVICE AND PROCESS FOR MONITORING THE DEPLOYMENT OF RESPIRATOR USERS

(75) Inventor: Werner Jumpertz, Stockelsdorf (DE)

(73) Assignee: Dräger Safety AG & Co. KGaA (DE)

( * ) Notice: Subject to any disclaimer, the term of this patent is extended or adjusted under 35 U.S.C. 154(b) by 377 days.

(21) Appl. No.: 10/738,464

(22) Filed: Dec. 17, 2003

(65) Prior Publication Data
US 2004/0164997 A1    Aug. 26, 2004

(30) Foreign Application Priority Data
Dec. 18, 2002   (DE) ............................. 102 59 123

(51) Int. Cl.
*G09G 5/00* (2006.01)
*G02F 1/01* (2006.01)
*H01L 31/00* (2006.01)

(52) U.S. Cl. .................. 345/8; 345/619; 345/589; 250/330; 250/331; 250/332; 250/333; 250/334; 348/157; 348/376

(58) Field of Classification Search .............. 345/8, 345/589, 619; 250/330–332, 338.1, 252.1; 348/376, 157; 359/425; 340/573.1
See application file for complete search history.

(56) References Cited

U.S. PATENT DOCUMENTS

| | | | | |
|---|---|---|---|---|
| 5,846,085 A | * | 12/1998 | Witt, III | 434/226 |
| 6,198,394 B1 | * | 3/2001 | Jacobsen et al. | 340/573.1 |
| 6,255,650 B1 | * | 7/2001 | Warner et al. | 250/330 |
| 6,421,031 B1 | * | 7/2002 | Ronzani et al. | 345/8 |
| 6,704,044 B1 | * | 3/2004 | Foster et al. | 348/157 |
| 2002/0101568 A1 | | 8/2002 | Eberl et al. | |

FOREIGN PATENT DOCUMENTS

DE    101 03 922    8/2002

* cited by examiner

*Primary Examiner*—Jin-Cheng Wang
(74) *Attorney, Agent, or Firm*—McGlew & Tuttle P.C.

(57) ABSTRACT

A monitoring device, process and system use an image recording device for recording an image falling on the eyes of the user of the device. The monitoring device includes a display and a signal processor with which at least the image signals recorded by the image recording device can be evaluated. An input medium and a storage medium are used for storing and retrieving information about the topology of the building. An instantaneous position of the user of the device is determined by evaluating the image signals sent by the image recording device by pattern recognition.

18 Claims, 1 Drawing Sheet

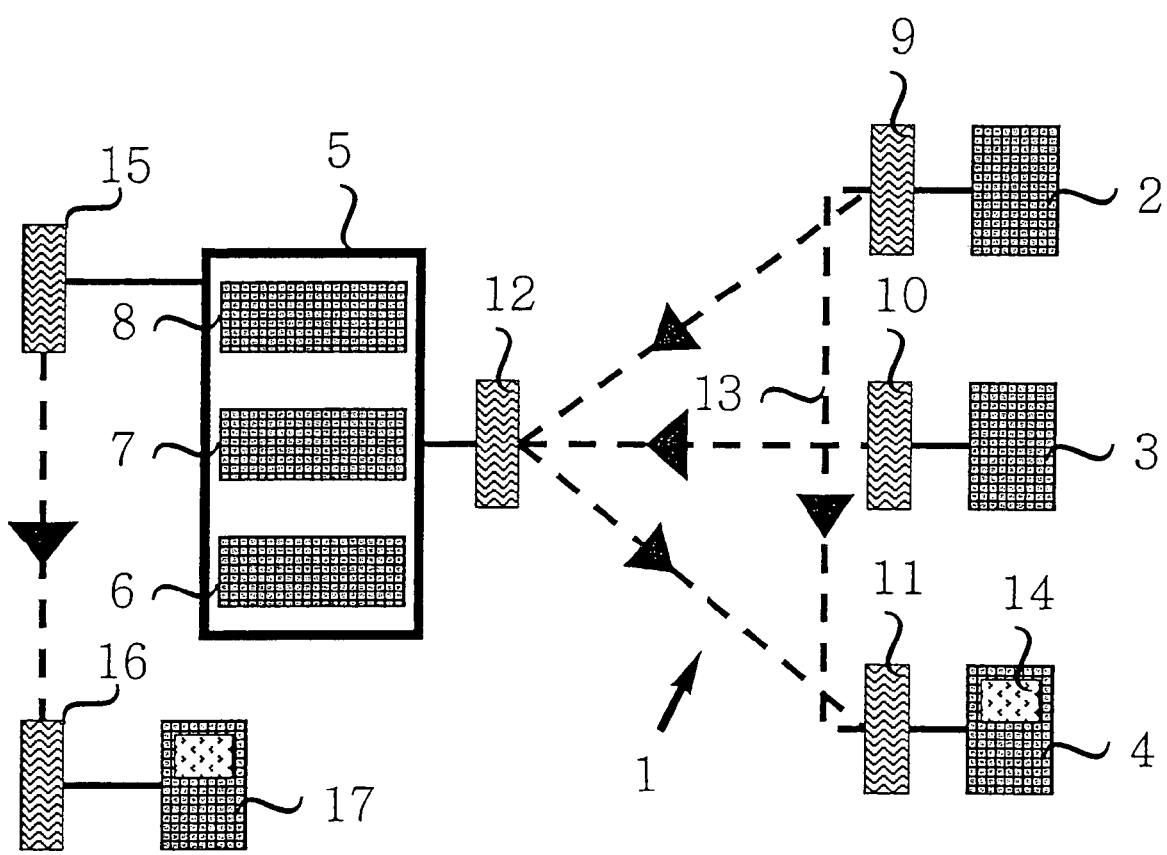

DEVICE AND PROCESS FOR MONITORING THE DEPLOYMENT OF RESPIRATOR USERS

FIELD OF THE INVENTION

The present invention relates generally to respiration systems and more particularly to a device, system and process for monitoring the use of respirators.

BACKGROUND OF THE INVENTION

An information system for firefighters has become known from DE 101 03 922 A1. The prior-art information system comprises a mobile fire station command center and helmet systems, which are carried by the firefighters. This helmet system comprises an image recording means for an image that can be received over the eyes, a display means, which can be perceived in the range of vision, as well as infrared and laser sensors. Each helmet system is equipped for communication with a radio transmission system, which communicates bidirectionally with the mobile fire station command center. The signals received from the individual image recording means are displayed on monitors there. Additional information, e.g., orientation data obtained by means of the position sensors and points of the compass, may also be faded into the field of view of the firefighter via the display means. Due to the linking of the helmet systems via the mobile fire station command center, the position of a fire fighter colleague can be faded in via the display means by corresponding processing of the position information recorded.

The drawback of the prior-art information system is that position sensors can record the position only inaccurately and as a result, a firefighter cannot be immediately located in a hazardous situation, especially if smoke is also intensely released at the same time. Positioning systems, such as GPS, are, moreover, unsuitable for use within buildings.

SUMMARY OF THE INVENTION

The basic object of the present invention is to provide a monitoring system and a process for monitoring the deployment of respirator users, with which accurate positioning within buildings is possible.

According to the invention a device for monitoring the deployment of respirator users is provided as well as a system using the device. The device has an image recording means for recording an image falling within a view range, preferably about the same view range as the view range of the user. A display means is provided as well as a signal processing means with which at least the image signals recorded by the said image recording means can be evaluated. An input medium is provided as well as a storage medium for the topology of a building. The device has a position determination means for determining an instantaneous position of the device user by evaluating the image signals sent by the image recording means by pattern recognition.

According to a further aspect of the invention, a process is provided for monitoring the deployment of respirator users. The process includes recording image signals with a image recording means. The image signals are based on a view range that about corresponds to an image falling on the eyes of the device user. The topology of a building is stored in which the user of the device is located using a storage medium. The instantaneous position of the user of the device within the building is determined by the evaluation of the image signals by means of pattern recognition.

The advantage of the present invention is essentially that based on the stored topology of the building, the position is determined directly by the evaluation of an image signal supplied by an image recording means by means of pattern recognition and a direct reference to the building topology is thus established. As a result, a markedly greater accuracy of the positioning can be achieved than would be possible with conventional laser sensors. For example, it is thus possible to determine whether the user of the device is located in front of or behind a wall or whether he has already passed through a certain door.

Building topology is defined here as fixed points, e.g., support columns, door openings, window openings as well as stairs, which do not change even in case of a fire and thus are suitable for use as reference points. An infrared camera, which delivers usable patterns even in a dark and smoke-filled atmosphere, is especially suitable for use as an image recording means. The instantaneous position is displayed by means of a display means, which can be carried by the user of the device.

It is especially useful to use a bar code reader as the input medium. It is possible, for example, to store the building topology in the form of a bar code at the entrance or to retrieve a stored building topology based on a bar code at the entrance. The code can be read into the monitoring device with the reader before entering the building.

As an alternative to a bar code, the building topology may also be stored in a transponder or to retrieve a stored building topology based on a signal from a transponder.

As an alternative to a bar code reader or in addition thereto, the input medium may also be a speech input device in the form of a microphone. For example, it is possible with a microphone to state the exact position data, e.g., "fourth window on the third floor," on entering the building. When the user of the device is then located within the building, the exact position can be determined with the image signal delivered by the image recording means and the pattern recognition.

A memory chip, which is inserted into the monitoring device, is also especially suitable for use as an input medium for the building topology. Memory chips have the advantage that they can be updated more easily than bar codes, which are permanently located at the entrance to the building. For example, it is thus possible for each device user to receive for a deployment an updated memory chip, which is activated on entry into the building (by a transponder or a bar code or other means).

The display means is preferably arranged in the field of view of the user of the device within a gas mask or a helmet visor. It is especially useful to transmit the position data and the image signals to a deployment center. The exact position of the user of the device can thus be determined in the deployment center, and it is displayed where other device users, who carry the monitoring system according to the present invention, may be possibly located. Whether it is still possible to work in the building can be better assessed on the basis of the image data received.

The process of the present invention for monitoring the deployment of respirator users comprises:
the recording of image signals, which correspond to an image falling on the eyes of the user of the device, with an image recording means;
the storing of the topology of a building, in which the user of the device is located, in a storage medium; and the determination of the instantaneous position of the user of the device within the building by the evaluation of the image signals by means of pattern recognition.

An exemplary embodiment of the present invention is shown in the FIGURE and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE is a schematic view of a monitoring device for a respirator user according to the invention.

DESCRIPTION OF THE PREFERRED EMBODIMENT

Referring to the drawings in particular, the only FIGURE schematically shows a monitoring device 1 for a respirator user with an infrared camera 2 as the image recording means, a microphone 3 as the speech input device, a mask display 4 as the display means, and a portable computer 5 with a plug-in storage module 6 for storing the topology of a building. The computer 5 contains a microprocessor 7, with which all computation operations and image processing are carried out, as well as a program module 8 for pattern recognition, which is used in conjunction with the evaluation of image signals. The infrared camera 2, the microphone 3 and the mask display 4 are connected to a transceiver-receiver 12 located at the computer 5 for bidirectional data communication in a wireless manner by means of individual transceiver-receivers 9, 10, 11. There is a data line 13 between the infrared camera 2 and the mask display 4, with which the direct output of received image signals is possible via the mask display 4.

The monitoring device 1 according to the present invention operates as follows.

The infrared camera 2 is located on a helmet of a respirator user, not shown in the FIGURE, and it records image signals, which approximately correspond to an image falling on the eyes of the user. The mask display located on a gas mask, likewise not shown in the FIGURE, is in the range of vision of the user of the device and contains an LCD display 14, via which both symbols and images can be displayed. The infrared camera 2 and the mask display 4 are connected directly via the data line 13, so that the user of the device can view the image signals recorded by the infrared camera directly on the mask display 4. The image signals additionally enter the computer 5 via the transceiver-receiver means 9, 12. In the storage module 6, the computer 5 contains the topology of the building, in which the user of the device has to operate. The topology comprises, e.g., the location and the number of floors, support columns, window and door openings as well as stairs.

When the user of the device enters the building, he communicates his entry position via the microphone 3 to the computer 5 in the form of a coding, e.g., F 4.3, which means fourth window in the third floor. At the same time, image signals being sent by the infrared camera 2 reach the computer 5 and are linked there with the topology data of the memory 6 by means of the program module 8, and the initial position is thus determined. These position data are transmitted to a mobile deployment center 17 together with the image signals via the transceiver-receivers 15, 16. By including the building topology in the positioning, it can be recognized at the deployment center 17 whether the user of the device is located in front of or behind a wall and where other device users, who likewise carry the monitoring system according to the present invention, may be possibly located. When the user of the device changes his position, this is recorded by the infrared camera 2, and the computer 5 computes with the program module 8 a new position, which is likewise sent to the deployment center 17, on the basis of the topology data of the storage module 6. The FIGURE shows only one monitoring device 1, but a plurality of monitoring devices, which are provided with an individual coding, may be operated simultaneously, so that the person with whom the monitoring device 1 is associated can be recognized at the deployment center 17.

While a specific embodiment of the invention has been shown and described in detail to illustrate the application of the principles of the invention, it will be understood that the invention may be embodied otherwise without departing from such principles.

What is claimed is:

1. A device for monitoring the deployment of respirator users, the device comprising:
    an image recording means by which an image falling near or about the eyes of the device user can be recorded;
    a display;
    a signal processor for evaluating the image signals recorded by said image recording means;
    an input means for receiving data;
    a storage medium for storing building topography data;
    means for determining an instantaneous position of the device user by evaluating the image signals sent by said image recording means by pattern recognition of the image falling near or about the eyes of the device user and the stored building topography data.

2. The device in accordance with claim 1, wherein said input means comprises an input medium including a bar code reader.

3. The device in accordance with claim 1, wherein said input means comprises an input medium including a speech input device.

4. The device in accordance with claim 1, wherein said input means comprises an input medium including a memory chip.

5. The device in accordance with claim 1, wherein a LCD display is provided for providing an output of image signals via said display.

6. The device in accordance with claim 1, wherein said display is arranged in the field of view of the device user within a gas mask.

7. The device in accordance with claim 1, wherein the building topology data comprises fixed points including one or more of stairs, columns and window openings.

8. The device in accordance with claim 1, further comprising means for transmitting the position data and image signals to a deployment enter.

9. A process for monitoring the deployment of respirator users, the process comprising the steps of:
    recording of image signals with an image recording device, the image corresponding substantially to an image falling on the eyes of the device user;
    storing the topology of a building, in which the user of the device is located, in a storage medium; and
    determining the instantaneous position of the user of the device within the building by the evaluation of the image signals by means of pattern recognition by comparing patterns of said topography of the building with patterns of said recorded image signals for determining an instantaneous position of the device user.

10. The process in accordance with claim 9, further comprising using an input medium to call up the stored topology of the building from the storage medium wherein the entry position into the building is predetermined with said input medium.

11. A respirator user monitoring system comprising:
an image recording device connected to a respirator or to a user of the respirator for providing image signals;
a display;
a signal processor for evaluating the image signals recorded by said image recording device;
an input means for triggering the system for receiving data;
a storage medium for storing building topography data;
a processor receiving building topography data via said input means and evaluating said recorded image signals by comparing patterns of said building topography data with patterns of said recorded image signals for determining an instantaneous position of the device user.

12. The system in accordance with claim 11, wherein said input means comprises a bar code reader for one of providing data to said processor and triggering access to data stored in said storage medium by said processor.

13. The system in accordance with claim 11, wherein the input means comprises a speech input device for one of providing data to said processor and triggering access to data stored in said storage medium by said processor.

14. The system in accordance with claim 11, wherein the input means comprises a memory chip for one of providing data to said processor and triggering access to data stored in said storage medium by said processor.

15. The system in accordance with claim 11, wherein a LCD display is provided for providing an output of image signals via said display.

16. The system in accordance with claim 11, wherein said display is arranged in the field of view of the display user within a gas mask.

17. The system in accordance with claim 11, wherein the building topology comprises fixed points including one or more of stairs, columns and window openings.

18. The system in accordance with claim 11, further comprising a transmission means for transmitting position data and image signals to a deployment center.

* * * * *